(12) United States Patent
Baba et al.

(10) Patent No.: US 11,358,374 B2
(45) Date of Patent: Jun. 14, 2022

(54) LAMINATED FILM

(71) Applicant: Toray Advanced Film Co., Ltd., Tokyo (JP)

(72) Inventors: Yusuke Baba, Takatsuki (JP); Tetsuya Machida, Takatsuki (JP); Norihide Inoue, Takatsuki (JP); Naoya Nishimura, Otsu (JP); Masatoshi Ohkura, Otsu (JP); Toshiumi Tatsuki, Otsu (JP)

(73) Assignee: Toray Advanced Film Co., Ltd., Tokyo (JP)

( * ) Notice: Subject to any disclaimer, the term of this patent is extended or adjusted under 35 U.S.C. 154(b) by 241 days.

(21) Appl. No.: 16/757,663

(22) PCT Filed: Oct. 29, 2018

(86) PCT No.: PCT/JP2018/040015
§ 371 (c)(1),
(2) Date: Apr. 20, 2020

(87) PCT Pub. No.: WO2019/087992
PCT Pub. Date: May 9, 2019

(65) Prior Publication Data
US 2021/0197535 A1    Jul. 1, 2021

(30) Foreign Application Priority Data

Oct. 31, 2017    (JP) .............................. JP2017-210050

(51) Int. Cl.
| | | |
|---|---|---|
| *B32B 27/32* | (2006.01) |
| *B32B 25/08* | (2006.01) |
| *C09J 7/29* | (2018.01) |
| *C09J 7/38* | (2018.01) |
| *B32B 25/18* | (2006.01) |
| *C08L 9/06* | (2006.01) |
| *C08L 23/12* | (2006.01) |
| *C08L 53/00* | (2006.01) |
| *C09J 153/02* | (2006.01) |

(52) U.S. Cl.
CPC .............. *B32B 25/08* (2013.01); *B32B 25/18* (2013.01); *B32B 27/32* (2013.01); *C08L 9/06* (2013.01); *C08L 23/12* (2013.01); *C08L 53/00* (2013.01); *C09J 7/29* (2018.01); *C09J 7/381* (2018.01); *C09J 153/02* (2013.01); *B32B 2250/03* (2013.01); *B32B 2264/025* (2013.01); *B32B 2307/41* (2013.01); *B32B 2307/51* (2013.01); *B32B 2307/536* (2013.01); *B32B 2307/538* (2013.01); *C09J 2301/41* (2020.08); *C09J 2301/414* (2020.08); *C09J 2415/00* (2013.01); *C09J 2423/046* (2013.01); *C09J 2423/106* (2013.01); *C09J 2433/006* (2013.01)

(58) Field of Classification Search
CPC ...... B32B 2264/0292; B32B 2264/102; B32B 2264/104; B32B 2264/108; B32B 2264/12; B32B 2270/00; B32B 2307/41; B32B 2307/50; B32B 2307/51; B32B 2307/536; B32B 2307/538; B32B 2307/732; B32B 2307/748; B32B 2571/00; B32B 25/08; B32B 25/12; B32B 25/14; B32B 25/16; B32B 25/18; B32B 27/08; B32B 27/18; B32B 27/20; B32B 27/283; B32B 27/308; B32B 27/32; B32B 27/36; C08L 23/12; C08L 53/00; C08L 9/06; C09J 109/06; C09J 153/02; C09J 2301/124; C09J 2301/41; C09J 2301/414; C09J 2415/00; C09J 2423/046; C09J 2423/106; C09J 2433/006; C09J 7/29; C09J 7/38; C09J 7/381
See application file for complete search history.

(56) References Cited

U.S. PATENT DOCUMENTS

| | | | |
|---|---|---|---|
| 2012/0263947 A1* | 10/2012 | Ozawa | C09D 183/04 428/447 |
| 2013/0011614 A1 | 1/2013 | Nagae et al. | |
| 2019/0070833 A1 | 3/2019 | Machida et al. | |

FOREIGN PATENT DOCUMENTS

| | | |
|---|---|---|
| JP | 2008-150581 A | 7/2008 |
| JP | 2009-67927 A | 4/2009 |
| JP | 2010-6927 A | 1/2010 |
| JP | 2013-35910 A | 2/2013 |
| JP | 2013-227372 A | 11/2013 |
| JP | 2016-8274 A | 1/2016 |
| JP | 2016-20079 A | 2/2016 |
| JP | 2016-155950 A | 9/2016 |
| WO | 2011/122288 A1 | 10/2011 |
| WO | 2017/150430 A1 | 9/2017 |

\* cited by examiner

*Primary Examiner* — Lawrence D Ferguson
(74) *Attorney, Agent, or Firm* — DLA Piper LLP (US)

(57) ABSTRACT

A laminated film exhibits a certain adhesive property to various adherends having shapes or different irregularity shapes. The laminated film includes a resin layer A on one surface of a substrate and a resin layer B on the other surface. The resin layer A has a ten-point average surface roughness Rz(a) of 1.5 μm or more and 5.0 μm or less and a storage elastic modulus G' at 25° C. and 1 Hz of $3.0 \times 10^5$ Pa or more.

8 Claims, No Drawings

LAMINATED FILM

TECHNICAL FIELD

This disclosure relates to a laminated film exhibiting a certain adhesive force to various adherends having different irregularity shapes.

BACKGROUND

Products made of various materials such as synthetic resin, metal and glass are often treated in a state where materials that protect the surfaces of the products are affixed to the products to prevent the products from being scratched or stained during processing, transportation or storage. A typical example thereof is a surface protective film, and the surface protective film generally used includes an adhesive layer formed on a support substrate made of thermoplastic resin or paper. The surface of the adhesive layer is affixed to an adherend to coat the surface with the support substrate, thereby protecting the surface.

Particularly, in recent years, liquid crystal displays and touch panel devices have been widespread, and they are composed of members such as a large number of optical sheets and optical films made of synthetic resins. Such optical members have to reduce defects such as optical distortion as much as possible so that surface protective films are frequently used to prevent scratches and stains which may lead to such defects.

The properties of the surface protective film should meet the following requirements. For example, the surface protective film is not easily removed from an adherend when the surface protective film is exposed to environmental changes in temperature and humidity and the like, or receives small stresses; an adhesive and an adhesive component are not left on the adherend when being peeled off therefrom; and the surface protective film can be easily peeled off after processing or use.

Among the above optical members, as an adherend having irregularities in its surface such as a diffusion plate or a prism sheet, adherends having various surface shapes are in the marketplace. The development of a protective film capable of exhibiting a certain adhesive force to such adherends having different surface shapes and surface roughnesses has a problem.

Japanese Patent Laid-open Publication No. 2008-150581 discloses that change in an adhesive force with time is suppressed by controlling the surface roughness of an adhesive layer. However, the control range of the surface roughness is not appropriate so that the adhesive layer does not have a uniform adhesive force to adherends having various surface shapes and irregularities.

Japanese Patent Laid-open Publication No. 2010-6927 discloses that, by controlling the surface roughness of an adhesive layer, an unwinding force of a wound body is reduced. However, the adhesive layer is flexible so that the shape of an adherend is transferred without allowing the surface shape of the adhesive layer to be held after bonding. This causes an excessive adhesive force of the adhesive layer when being affixed to an adherend having irregularities on its surface such as a diffusion plate or a prism sheet.

Japanese Patent Laid-open Publication No. 2016-20079 discloses an effect of suppressing adhesive residues during peeling by controlling the surface roughness of an adhesive layer. However, the control range of the surface roughness is not appropriate so that the adhesive layer cannot exhibit a certain adhesive force to adherends having different irregularity shapes.

It could therefore be helpful to provide a laminated film exhibiting a certain adhesive force to various adherends having different irregularity shapes regardless of the surface shapes of the adherends.

SUMMARY

We thus provide:

A laminated film includes a resin layer A on one surface of a substrate and a resin layer B on the other surface, wherein the resin layer A has a ten-point average surface roughness Rz(a) of 1.5 µm or more and 5.0 µm or less and a storage elastic modulus G' at 25° C. and 1 Hz of $3.0 \times 10^5$ Pa or more.

We thus make it possible to provide a laminated film exhibiting a good adhesive property to various adherends having different irregularity shapes.

DETAILED DESCRIPTION

Hereinafter, details of our laminated films will be described. However, this disclosure is not limited to the examples to be described below.

Our laminated film can be achieved by a laminated film composed of at least three layers, and including a resin layer A on one surface of a substrate and a resin layer B on the other surface, wherein the resin layer A has a ten-point average surface roughness Rz(a) of 1.5 µm or more and 5.0 µm or less and a storage elastic modulus G' at 25° C. of $3.0 \times 10^5$ Pa or more.

The resin layer A constituting the laminated film refers to a layered product, and preferably has an adhesive property at room temperature.

The resin layer B constituting the laminated film refers to a layered product, and preferably has releasability from the resin layer A. When the laminated film having no resin layer B is wound as a wound body, the resin layer A is firmly affixed to the opposite surface to the resin layer A of the substrate, and the surface shape of the resin layer A after unwinding changes. This may cause a decreased adhesive force or difficult unwinding itself.

The ten-point average surface roughness Rz(a) of the resin layer A (hereinafter sometimes Rz(a)) is 1.5 µm or more and 5.0 µm or less. The ten-point average surface roughness Rz(a) is more preferably 2.0 µm or more and 5.0 µm or less, still more preferably 3.0 µm or more and 5.0 µm or less, and particularly preferably 3.5 µm or more and 5.0 µm or less. When the Rz(a) is less than 1.5 µm, the laminated film may not exhibit a certain adhesive force to adherends having different irregularity shapes. When the Rz(a) exceeds 5.0 µm, it may be difficult to maintain the adhesive property. Examples of a method in which the ten-point average surface roughness of the resin layer A is controlled include a method in which the irregularity shapes of the resin layer B are transferred, a method in which a material having a rough surface effect is used for the resin layer A or a substrate layer, and a transfer in which a roll having irregularity shapes, or the like is pressed onto the surface of the resin layer A.

The arithmetic average roughness Ra(a) of the resin layer A (hereinafter sometimes Ra(a)) is preferably 0.2 µm or more and less than 1 µm. The arithmetic average roughness Ra(a) is more preferably 0.3 µm or more and less than 0.8 µm, and still more preferably 0.4 µm or more and less than 0.6 μm. When the Ra(a) is less than 0.2, a certain adhesive force to adherends having different irregularity shapes may not be exhibited. When the Ra(a) exceeds 1.0 μm, it may be difficult to maintain the adhesive property. Examples of a method in which the arithmetic average roughness of the resin layer A is controlled include a method in which the irregularity shapes of the resin layer B are transferred, a method in which a material having a rough surface effect is used for the resin layer A or a substrate layer, and a transfer in which a roll having irregularity shapes, or the like is pressed onto the surface of the resin layer A.

The storage elastic modulus G' at 25° C. and 1 Hz of the resin layer A is $3.0 \times 10^5$ Pa or more. The storage elastic modulus G' is more preferably $5.0 \times 10^5$ Pa or more, still more preferably $7.0 \times 10^5$ Pa or more, and particularly preferably $1.0 \times 10^6$ Pa or more. When storage elastic modulus G' at 25° C. and 1 Hz of the resin layer A is less than $3.0 \times 10^5$ Pa, the resin layer A deforms together with the shape of the adherend during bonding so that the adhesive force is dependent on the shape of the adherend, which is apt to cause a difference in adhesive force between the resin layer A and the adherend. This may cause an excessive adhesive force. The upper limit of the storage elastic modulus G' at 25° C. and 1 Hz of the resin layer A is not particularly limited, but the substantial upper limit of the storage elastic modulus G' is $1.0 \times 10^8$ Pa or less because it may be difficult to provide the adhesive force. The storage elastic modulus G' at 25° C. and 1 Hz of the resin layer A can be adjusted by, for example, adjusting the raw material composition of the resin layer A when a laminated film is manufactured.

The ten-point average surface roughness Rz(a), arithmetic average roughness Ra(a), and storage elastic modulus G' at 25° C. of the surface of the resin layer A of the above laminated film can be calculated by methods to be described below.

The substrate constituting the laminated film is not particularly limited, but for example, a polyolefin or a polyester can be used as a resin used for the substrate. Among them, the polyolefin is preferably used as a main component from the viewpoint of productivity and processability. The main component described herein means a component having the highest % by mass (a component of a large content) among components constituting the substrate layer of the laminated film.

Examples of the polyolefin include low-density polyethylene, medium-density polyethylene, high-density polyethylene, linear low-density polyethylene, a low-crystalline or amorphous ethylene.α-olefin copolymer, polypropylene, a propylene-ethylene copolymer (random copolymer and/or block copolymer), a propylene.α-olefin copolymer, a propylene.ethylene.α-olefin copolymer, an ethylene.ethyl (meth)acrylate copolymer, an ethylene.methyl(meth)acrylate copolymer, an ethylene. n-butyl(meth)acrylate copolymer, and an ethylene.vinyl acetate copolymer. These may be used alone or in combination. The α-olefin is not particularly limited as long as the α-olefin can be copolymerized with propylene or ethylene. Examples thereof include 1-butene, 1-hexene, 4-methyl-1-pentene, 1-octene, 1-pentene, and 1-heptene. Among the above polyolefins, to roughen the surface shape of the substrate to control the ten-point average surface roughness Rz(a) and arithmetic average roughness Ra(a) of the resin layer A within desired ranges, a structure is preferable, in which domain components are dispersed in a matrix resin as a main component. The above structure can be formed by, for example, a method in which the main component constituting the resin layer A is polypropylene and a polyolefin incompatible therewith is added, or a method in which commercially available block polypropylene, i.e., a so-called block copolymer or an impact copolymer is used.

The substrate of the laminated film contains a small amount of each component constituting the resin layer A or the resin layer B, to improve the affinity of the substrate for the resin layer A or the resin layer B, which is preferable from the viewpoint of increasing an interface adhesive force. As a method in which an adhesive layer component is added to the substrate layer, it is preferable that a method in which the laminated film is collected, and a collected raw material which is recycled is added and used is employed from the viewpoint of recycling the resin and reducing the production cost.

The melt flow rate of the resin used for the substrate (MFR, measured at 230° C. and 21.17 N) is preferably 0.5 g/10 minutes or more, more preferably 1 g/10 minutes or more, and still more preferably 2 g/10 minutes or more. If the MFR is less than 0.5 g/10 minutes, the melt viscosity is too high, which may cause deteriorated productivity. The upper limit of the MFR is preferably 30 g/10 minutes or less, more preferably 25 g/10 minutes, and still more preferably 20 g/10 minutes. If the MFR is more than 30 g/10 minutes, it may be difficult to control the ten-point average surface roughness Rz(a) and arithmetic average roughness Ra(a) of the resin layer A.

The substrate may contain particles for the purpose of controlling the ten-point average surface roughness Rz(a) and arithmetic average roughness Ra(a) of the surface of the resin layer A. For example, inorganic particles and organic particles and the like can be used. Examples of the inorganic particles include silica, titanium oxide, aluminum oxide, zirconium oxide, calcium carbonate, carbon black, and zeolite particles. Examples of the organic particles include acrylic resin particles, styrene-based resin particles, polyolefin-based resin particles, polyester-based resin particles, polyurethane-based resin particles, polycarbonate-based resin particles, polyamide-based resin particles, silicone-based resin particles, fluorine-based resin particles, or copolymerized resin particles of two or more monomers used in the synthesis of the resin. These may be used alone or in combination.

The average particle diameter of the particles is preferably 0.1 μm or more, more preferably 1.0 μm or more, and still more preferably 5.0 μm or more. If the average particle diameter is less than 0.1 μm, the aggregation of the particles may occur, or effects of controlling the Rz(a) and the Ra(a) may not be obtained. Meanwhile, the upper limit of the average particle diameter is preferably equal to or less than the thickness of the substrate layer, or 50.0 μm or less, more preferably 40.0 μm or less, and still more preferably 30.0 μm or less. When the average particle diameter exceeds the thickness of the substrate layer or exceeds 50.0 μm, coarse defects occur, which may cause deteriorated productivity, or may not provide an adhesive force.

In the composition constituting the substrate, various additives such as a crystal nucleating agent, a lubricant, an antioxidant, a weathering agent, an antistatic agent and a pigment may be appropriately added as long as the properties of the laminated film are not impaired. The substrate may contain an easy-adhesion component for good lamination with the resin layer A.

The thickness of the substrate constituting the laminated film can be appropriately adjusted according to the required properties of the laminated film, but the thickness is preferably 5 μm or more, more preferably 10 μm or more, and still more preferably 20 μm or more. If the thickness of the substrate is less than 5 μm, the strength of the laminated film is insufficient, which may make it difficult to transport the laminated film in a manufacturing process, or may cause the laminated film to be broken during processing or use. The upper limit of the thickness of the substrate is preferably 200 μm or less, more preferably 100 μm or less, and still more preferably 80 μm or less. If the thickness exceeds 200 μm, the haze of the film may increase or the productivity may be deteriorated. In particular, the following property of the film to an adherend having irregularities in its surface is insufficient, which may cause a decreased adhesive force.

The laminated film includes the resin layer A on one surface of the substrate. The resin layer A preferably has an adhesive property at room temperature, and refers to a layered product.

The composition constituting the resin layer A of the laminated film is not particularly limited as long as the desired effects are not impaired, and acrylic, silicone-based, natural rubber-based, and synthetic rubber-based known materials and the like can be used. Among these, it is preferable to use a thermoplastic synthetic rubber-based adhesive from the viewpoint of recyclability. Among these, a styrene-based elastomer is more preferable.

As the styrene-based elastomer, styrene.conjugated diene-based copolymers such as a styrene.butadiene copolymer (SBR), a styrene.isoprene.styrene copolymer (SIS), and a styrene.butadiene.styrene copolymer (SBS), hydrogenated products thereof (for example, a hydrogenated styrene.butadiene copolymer (HSBR), a styrene.ethylene butylene.styrene triblock copolymer (SEBS), a styrene.ethylene butylene diblock copolymer (SEB)), and styrene.isobutylene-based copolymers (for example, a styrene.isobutylene.styrene triblock copolymer (SIBS), a styrene.isobutylene diblock copolymer (SIB), or a mixture thereof) can be used. Among the above, the styrene.conjugated diene copolymers such as a styrene.butadiene.styrene copolymer (SBS), hydrogenated products thereof, and the styrene.isobutylene-based copolymer are preferably used. Only one of the styrene-based elastomers may be used, or two or more thereof may be used in combination. Furthermore, if necessary, a material other than the styrene-based elastomer may be used.

The weight average molecular weight of the styrene-based elastomer is preferably 50,000 to 400,000, and more preferably 50,000 to 300,000. If the weight-average molecular weight is less than 50,000, the cohesive force of the resin layer A is reduced, which may cause adhesive residues to occur when the resin layer A is peeled off from the adherend. If the weight-average molecular weight exceeds 400,000, the viscosity is increased, which may cause deteriorated productivity.

The content of styrene in the styrene-based elastomer is preferably 5% by mass or more, more preferably 8% by mass or more, and still more preferably 10% by mass or more, when the total amount of the styrene-based elastomer is 100% by mass. If the content of styrene is less than 5% by mass, the cohesive force of the resin layer A is reduced, which may cause adhesive residues to occur when the resin layer A is peeled off from the adherend. Meanwhile, the upper limit of the content of styrene in the styrene-based elastomer is preferably 60% by mass. If the content of styrene exceeds 60% by mass, the affixing property of the resin layer A to the adherend is deteriorated so that, in particular, the adhesive property of the resin layer A to the adherend having irregularities may be insufficient.

The styrene-based elastomer in the resin A has a hardness of 50 or more, more preferably 55 or more, and still more preferably 60 or more. The hardness of the styrene-based elastomer can be measured by a durometer type A hardness measured according to ISO7619. If the hardness of the styrene elastomer in the resin layer A is less than 50, the resin layer A may not exhibit a certain adhesive force to adherends having different irregularity shapes.

An olefin-based resin may be added to the resin layer A in addition to the styrene-based elastomer. By adding the olefin-based resin, the adhesive force is adjusted, and good film-forming properties are obtained. Examples of the olefin-based resin include low-density polyethylene, medium-density polyethylene, high-density polyethylene, linear low-density polyethylene, ultra-high-molecular-weight polyethylene, a low-crystalline or amorphous ethylene.α-olefin copolymer, crystal polypropylene, low-crystalline polypropylene, amorphous polypropylene, a propylene. ethylene copolymer (random copolymer and/or block copolymer), a propylene.α-olefin copolymer, a propylene.ethylene.α-olefin copolymer, polybutene, a 4-methyl-1-pentene.α-olefin copolymer, an ethylene.ethyl (meth)acrylate copolymer, an ethylene.methyl(meth)acrylate copolymer, an ethylene.n-butyl(meth)acrylate copolymer, and an ethylene.vinyl acetate copolymer. These may be used alone or in combination. The α-olefin is not particularly limited as long as the α-olefin can be copolymerized with ethylene, propylene, and 4-methyl-1-pentene. Examples thereof include ethylene, propylene, 1-butene, 1-hexene, 4-methyl-1-pentene, 1-octene, 1-pentene, and 1-heptene.

Among the above olefin-based resins, low-density polyethylene, linear low-density polyethylene, an ethylene.α-olefin copolymer, polypropylene, a propylene.α-olefin copolymer, polybutene, low-crystalline polypropylene, amorphous polypropylene, and a 4-methyl-1-pentene.α-olefin copolymer are preferably used. The content of the olefin-based resin is preferably 80% by mass or less, more preferably 50% by mass or less, and still more preferably 40% by mass or less, when the total amount of the resin layer A is 100% by mass.

The resin layer A may contain particles to control the ten-point average surface roughness Rz(a) and arithmetic average roughness Ra(a) of the resin layer A. As the particles, for example, inorganic particles or organic particles or the like can be used, and the particles are preferably organic particles which are less likely to damage the adherend. Examples of the organic particles include acrylic resin particles, styrene-based resin particles, polyolefin-based resin particles, polyester-based resin particles, polyurethane-based resin particles, polycarbonate-based resin particles, polyamide-based resin particles, silicone-based resin particles, fluorine-based resin particles, or copolymerized resin particles of two or more monomers used in the synthesis of the resin. These may be used alone or in combination.

The average particle size of the particles is preferably 0.1 μm or more, more preferably 1.0 μm or more, and still more preferably 2.0 μm or more. If the average particle diameter is less than 0.1 μm, the aggregation of the particles may occur, or effects of controlling the Rz(a) and the Ra(a) may not be obtained. Meanwhile, the upper limit of the average particle diameter is preferably 2.0 times or less of the thickness of the resin layer A or 20.0 μm or less, more preferably 15.0 μm or less, and still more preferably 10.0 μm or less. When the average particle size exceeds 2.0 times the thickness of the resin layer A or exceeds 20.0 μm, a desired adhesive force may not be obtained.

In addition to the above, other components such as a tackifier, a lubricant and other additives may be appropriately added to the resin layer A as long as the desired effect is not impaired.

As the tackifier, petroleum resins such as aliphatic copolymers, aromatic copolymers, aliphatic.aromatic copolymers and alicyclic copolymers, terpene-based resins, terpene phenol-based resins, rosin-based resins, alkylphenol-based resins, xylene-based resins or hydrogenated products thereof can be used. The content of the tackifier is preferably 40% by mass or less, and more preferably 30% by mass or less, when the total amount of the resin layer A is 100% by mass. If the content of the tackifier is more than 40% by mass, adhesive residues occurs when the laminated film is bonded to the adherend, and then peeled off, which may contaminate the adherend, or may cause a part of the tackifier to bleed out to the surface of the resin layer A over time or when being stored during heating, to cause an excessive adhesive force.

When the styrene-based elastomer is formed into chips, the lubricant used for the resin layer A adheres to the surfaces of the chips to prevent the chips from adhering to each other, or from blocking each other, is deposited on the surface of the resin layer A to adjust the adhesive force or added to obtain good extrudability when the resin layer A is melt-extruded. Examples thereof include fatty acid metal salts such as calcium stearate and magnesium behenate, fatty acid amides such as ethylene bisstearic acid amide and hexamethylene bisstearic acid amide, and waxes such as polyethylene wax, polypropylene wax and paraffin wax. The content of the lubricant is preferably 10% by mass or less, more preferably 5% by mass or less, and particularly preferably 3% by mass or less, when the total amount of the resin layer A is 100% by mass. When the content of the lubricant is more than 10% by mass, particularly when the adhesive force to the adherend having irregularities is insufficient, or when the resin layer A is molded by a melt extrusion method, a part of the lubricant may be sublimated, which may contaminate a die and adhere to the product.

Examples of the other additives include a crystal nucleating agent, an antioxidant, a heat resistance imparting agent, a weathering agent and an antistatic agent. These additives may be used alone or in combination, but the total content thereof is preferably 3% by mass or less, and more preferably 2% by mass or less when the total amount of the resin layer A is 100% by mass. When the total content of the additives is more than 3% by mass, the additives bleed out from the resin layer A, which may cause defects in the product or may contaminate the adherend.

The thickness of the resin layer A can be appropriately adjusted depending on the material, thickness, surface shape and required level of the adherend, but the thickness is preferably 0.5 μm or more, more preferably 1.0 μm or more, and still more preferably 1.5 μm or more. If the thickness of the resin layer A is less than 0.5 μm, a sufficient adhesive force may not be exhibited. The thickness of the resin layer A is preferably 10 μm or less, more preferably 7 μm or less, still more preferably 5 μm or less, and particularly preferably 4 μm or less. When the thickness of the resin layer A is more than 10 μm, the adhesive force may become excessive, or the ten-point average surface roughness $Rz(a)$ and arithmetic average roughness $Ra(a)$ of the resin layer A may be reduced.

When the thickness of the resin layer A is taken as t, the relationship of $t \leq Rz(a)$ is preferably satisfied, more preferably $t \leq Rz(a)-0.5$, and still more preferably $t \leq Rz(a)-1.0$. The laminated film has irregularity shapes in the surface of the resin layer A to form a contact pattern following the irregularity shapes when being bonded to the adherend. The laminated film has the contact pattern, whereby a contact area during bonding is constant regardless of the shape of the adherend so that a certain adhesive force to the adherends having different irregularity shapes and surface roughnesses can be exhibited. At this time, as the thickness t of the resin layer A is larger, the amount of deformation in the thickness direction of the resin layer A due to pressure during bonding is larger. When $t>Rz(a)$ is set, the amount of deformation of the resin layer A in the thickness direction during bonding may be greater than the roughness $Rz(a)$ of the adherend, which may cause an increased area contact of the resin layer A with the adherend to cause excessive adhesion.

When the ten-point average surface roughness of the adherend to which the laminated film is bonded is taken as $Rz(m)$, the relationship between the $Rz(m)$ and the roughness $Rz(a)$ of the resin layer A preferably satisfies $Rz(m) \leq Rz(a)$, more preferably $Rz(m) \leq Rz(a)-0.5$, and still more preferably $Rz(m) \leq Rz(a)-1.0$. The adherend refers to an object to which the laminated film is bonded. The laminated film has irregularity shapes in the surface of the resin layer A to form a contact pattern following the irregularity shapes when being bonded to the adherend. The laminated film has the contact pattern, whereby the contact area is constant regardless of the surface shape of the adherend so that a film having a certain adhesive force to the adherends having different irregularity shapes can be provided. When both the resin layer A and the surface of the adherend have irregularity shapes, a larger ten-point average surface roughness $Rz$ contributes to the contact pattern. Therefore, when $Rz(a) < Rz(m)$ is set, the contact pattern is largely affected by the surface shape of the adherend, which may be less likely to provide an effect of providing a certain adhesive force to the adherend having large irregularities.

The laminated film has a resin layer B on the surface of the substrate opposite to the resin layer A. The resin layer B preferably has releasability, and refers to a layered product.

Examples of the resin used for the resin layer B of the laminated film include a polyolefin and a polyester. Among them, the polyolefin is preferably used as a main component from the viewpoint of productivity and processability. The main component described herein means a component having the highest % by mass (a component having a large content) among components constituting the resin layer B of the laminated film.

Examples of the polyolefin include low-density polyethylene, medium-density polyethylene, high-density polyethylene, linear low-density polyethylene, a low-crystalline or amorphous ethylene.α-olefin copolymer, polypropylene, a propylene.ethylene copolymer (random copolymer and/or block copolymer), a propylene.α-olefin copolymer, a propylene.ethylene.α-olefin copolymer, an ethylene.ethyl (meth)acrylate copolymer, an ethylene.methyl(meth)acrylate copolymer, an ethylene.n-butyl(meth)acrylate copolymer and an ethylene.vinyl acetate copolymer. These may be used alone or in combination. The α-olefin is not particularly limited as long as the α-olefin can be copolymerized with propylene or ethylene. Examples thereof include 1-butene, 1-hexene, 4-methyl-1-pentene, 1-octene, 1-pentene and 1-heptene. Among the above polyolefins, to control the ten-point average surface roughness $Rz(r)$ (hereinafter sometimes $Rz(r)$) of the resin layer B to a desired range, a structure is preferable, in which a domain resin having poor compatibility is dispersed in a matrix resin as a main component. The above structure can be formed by, for example, a method in which the main component constituting the resin layer B is polypropylene and a polyolefin incompatible therewith is added or a method in which commercially available block polypropylene, i.e., a so-called block copolymer or an impact copolymer is used.

The melt flow rate (MFR, measured at 230° C. and 21.17 N) of the resin used for the resin layer B is preferably 0.5 g/10 minutes or more, more preferably 1 g/10 minutes or more, and still more preferably 2 g/10 minutes or more. If the MFR is less than 0.5 g/10 minutes, the melt viscosity is too high, which may cause deteriorated productivity. The upper limit of the MFR is preferably 30 g/10 minutes or less, more preferably 25 g/10 minutes, and still more preferably 20 g/10 minutes. If the melt flow rate is more than 30 g/10 minutes, the ten-point average surface roughness Rz(r) of the resin layer B decreases, which may cause difficult unwinding after the laminated film is wound.

It is preferable that as the material constituting the resin layer B, a lubricant such as a fluorine-based resin, a silicone-based resin, a fatty acid metal salt, a fatty acid amide, inorganic particles, or organic particles is further added as a release agent. When the lubricant is not contained, the surface shape of the resin layer A deforms when the laminated film is wound and unwound, which may not exhibit a certain adhesive force to adherends having different irregularity shapes.

The laminated film has the resin layer B, whereby the laminated film can be wound in a good winding shape when the laminated film is wound into a roll in a manufacturing process or a slitting process, or a force when the film is unwound from a roll during slitting or use does not become too large, which can provide good unwinding. Another example of a method in which mold releasability is applied to the surface opposite to the resin layer A in the laminated film includes a method in which the above lubricant or the like is added to the substrate without providing the resin layer B. However, a method in which the resin layer B is provided from the viewpoint of productivity, cost and a release effect is more preferable.

The ten-point average surface roughness Rz(r) of the resin layer B of the laminated film is preferably 3.5 µm or more, more preferably 4.0 µm or more, and still more preferably 4.5 µm or more. When the ten-point average surface roughness Rz(r) is less than 3.5 µm, it may be difficult to satisfactorily wind the laminated film in the manufacturing process or the slitting process. The upper limit of the Rz(r) is not particularly set, but if the Rz(r) is 20 µm or more, thickness accuracy or strength may be disadvantageously deteriorated.

The relationship between the ten-point average surface roughness Rz(a) of the resin layer A and the ten-point average surface roughness Rz(r) of the resin layer B preferably satisfies Rz(a)≤Rz(r), more preferably Rz(a)≤Rz(r)−1.0, and still more preferably Rz(a)≤Rz(r)−1.5. When Rz(r)<Rz(a) is set, the Rz(a) is reduced by transferring the surface shape of the resin layer B when the wound body is formed, which may not exhibit a certain adhesive force to adherends having different irregularity shapes.

The haze value of the laminated film is preferably 40% or less, more preferably 35% or less, still more preferably 30% or less, and particularly preferably 25% or less. When the haze of the laminated film exceeds 40%, the testability of the laminated film may be deteriorated, or it may be difficult to inspect a product in a state where the laminated film is bonded to the adherend. The lower limit of the haze value is not particularly set, but if the haze value is less than 1%, the smoothed resin layer A may not exhibit a certain adhesive force to adherends having different irregularity shapes.

Next, a method of manufacturing our laminated films will be described.

The method of manufacturing a laminated film is not particularly limited. In a three-layer laminated structure of the substrate, the resin layer A, and the resin layer B, examples thereof include a so-called co-extrusion method in which each of resin compositions constituting the three layers is melt-extruded from a separate extruder, and the resin compositions are laminated and integrated in a die, and a method in which the substrate, the resin layer A, and the resin layer B are individually melt-extruded, and then laminated by a laminating method. The laminated film is preferably manufactured by the co-extrusion method from the viewpoint of productivity. As the material constituting each layer, one obtained by mixing the materials with a Henschel mixer or the like may be used, or one obtained by kneading all or a part of the materials of the layers in advance may be used. As the co-extrusion method, a known method such as an inflation method or a T-die method is used. From the viewpoint of excellent thickness accuracy and surface shape control, a hot-melt co-extrusion method using the T-die method is particularly preferable.

In manufacturing due to the co-extrusion method, constituents of the substrate, the resin layer A, and the resin layer B are extruded from a melt extruder. At this time, the extrusion temperature of the substrate resin is preferably 250° C. or lower, more preferably 230° C. or lower, and still more preferably 220° C. or lower. When the extrusion temperature of the substrate resin exceeds 250° C., the ten-point average surface roughness Rz(a) and arithmetic average roughness Ra(a) of the surface of the resin layer A may not be allowed to be controlled in desired ranges. The lower limit of the extrusion temperature is not particularly set, but if the resin temperature is lower than 180° C., the melt viscosity is too high, which may cause deteriorated productivity.

The substrate, the resin layer A, and the resin layer B are laminated and integrated in a T-die for co-extrusion. The co-extruded product can be cooled and solidified by a metal cooling roll, formed into a film shape, and wound in a roll shape to obtain a laminated film.

The laminated film can be used as a surface protective film that prevents scratches during manufacturing, processing, and transportation of a synthetic resin plate, a metal plate, and a glass plate and the like and that prevents adhesion of dirt. For example, the laminated film is preferably used as an optical surface protective film having irregularities in its surface such as a diffusion plate or a prism sheet. Among these, the laminated film is preferably used as a protective film for a matte surface of a prism sheet.

EXAMPLES

Hereinafter, our laminated films will be more specifically described based on Examples, but this disclosure is not limited to these Examples. Various physical properties were measured and evaluated by the following methods.

(1) Surface Roughness

For the ten-point average surface roughness Rz(a) of a resin layer A, the ten-point average surface roughness Rz(r) of a resin layer B, and the ten-point average surface roughness Rz(m) of the matte surface of a prism sheet as an adherend, a high accuracy fine shape measuring device (SURFCORDER ET4000A) manufactured by Kosaka Laboratory Ltd. was used according to JIS B0601-1994 to take 21 measurements at 10 μm intervals in the length direction in a state where a scanning direction was set to a width direction of 2 mm in the transverse direction and 0.2 mm in the length direction of the laminated film and the adherend, followed by carrying out three dimensional analysis and making evaluations. The measuring conditions included the use of a diamond needle with a stylus tip radius of 2.0 μm, a measuring force of 100 μN, and a cut-off of 0.8 mm.

(2) Storage Elastic Modulus G'

From laminated films shown in Examples and Comparative Examples, only the resin layer A was scraped off using a stainless steel spatula, and this was melt-molded into a sample with a thickness of 1 mm. The sample was heated in an AR2000ex rheometer manufactured by TA Instruments at a heating rate of 10° C./min over a temperature range from minus 50° C. to plus 150° C. while subjecting it to dynamic shear deformation at a frequency of 1 Hz and a strain of 0.01% to measure the storage elastic modulus G' at 25° C.

(3) Thickness

Using a microtome method, an ultrathin section was prepared, which had a width of 5 mm and had a cross section in a transverse direction and a laminated body thickness direction of the laminated film, and the cross section was coated with platinum to obtain an observation sample. Next, using a field emission scanning electron microscope (S-4800) manufactured by Hitachi, Ltd., the cross section of the laminated film was observed at an acceleration voltage of 1.0 kV. The thicknesses of the substrate, resin layer A, and resin layer B, and the total thickness of the laminated film were measured from any place of the observed image. The resin layers A and B were observed at an observation magnification of 10,000 times, and the substrate and the laminated film were observed at an observation magnification of 1,000 times. Furthermore, the same 20 measurements were taken in total, and the average value thereof was used as the thickness of each of the substrate and the resin layers A and B, and the total thickness of the laminated film.

(4) Haze

The haze was measured using a haze meter NDH-5000 manufactured by Nippon Denshoku Industries Co., Ltd. Five pieces were cut out from each sample and measured, and the average values of N=5 were compared.

(5) Bonding of Laminated Film

The resin layer A of the laminated film of each of Examples and Comparative Examples stored and adjusted for 24 hours at a temperature of 23° C. and a relative humidity of 50% was laminated with a matte surface of a prism sheet having the matte surface on a back surface, at a laminating pressure of 0.35 MPa using a roll press mill (special type pressure-bonding roller, manufactured by Yasuda Seiki Seisakusho, Ltd.). Two types of prism sheets, i.e., a prism sheet having a matte surface having an arithmetic average surface roughness Ra(m) of 0.4 μm and a ten-point average surface roughness Rz(m) of 3.0 μm (hereinafter adherend A), and a prism sheet having an Ra(m) of 0.5 and an Rz(m) of 3.5 μm (hereinafter adherend B) were prepared. In the prism sheets, an acrylic material constituting a matte portion was used.

(6) Adhesive Force

The bonded sample obtained in the above (5) was stored in a room at 50° C. for 72 hours, and a tensile tester (Tensilon universal tester, manufactured by Orientec Co., Ltd.) was then used to measure the adhesive force under the conditions of a tension speed of 300 mm/min and a peeling angle of 180°. The adhesive force of each of the adherend A and the adherend B was measured for one type of laminated film, and an adhesive force ratio between the adherend A and the adherend B was calculated according to equation (a).

Adhesive force ratio=adhesive force with adherend A/adhesive force with adherend B (a)

As the adhesive force ratio between the adherend A and the adherend B calculated based on the equation (a) was closer to 1, the laminated film exhibited a certain adhesive force to adherends having different irregularity shapes, and evaluated according to the following three stages.

Very good: the adhesive force ratio is 0.5 or more and less than 2.0
Good: the adhesive force ratio is (i) 0.3 or more and less than 0.5, or (ii) 2.0 or more and less than 3.0
Poor: the adhesive force ratio is less than 0.3 or 3.0 or more.

(7) Hardness

The durometer type A hardness of the styrene-based elastomer sample used for the resin A was measured according to ISO7619 using a durometer hardness meter.

Example 1

A constituent resin of each layer was prepared as follows.
Substrate: 100% by mass of commercially available block polypropylene (J640F, manufactured by Hyosung) having an MFR of 8.5 g/10 minutes (measured at 230° C. and 21.17 N) was used.
Resin layer A: 100% by mass of SEBS ("TUFTEC" (registered trademark) S1606, manufactured by Asahi Kasei Corporation, MFR: 4 g/10 minutes (measured at 230° C., 21.17 N), hardness: 67) was used.
Resin Layer B: 97% by mass of commercially available block polypropylene (J640F, manufactured by Hyosung) having an MFR of 8.5 g/10 minutes (measured at 230° C. and 21.17 N), and 3% by mass of a silicone-based surface modifier ("EXFOLA" (registered trademark), manufactured by Mitsui Chemicals) as a release agent were used.
Next, the constituent resin of each layer was charged into each extruder of a T-die composite film forming machine having three extruders, and the discharge amount of each extruder was adjusted so that the thickness of the substrate was set to 30 μm; the thickness of the resin layer A was set to 3 μm; and the thickness of the resin layer B was set to 5 μm. These were laminated in this order. The laminated product was extruded from a composite T-die at an extrusion temperature of 200° C., cast on a roll having a surface temperature controlled at 40° C., and molded into a film. The molded product was wound to obtain a laminated film.
Then, the obtained laminated film was evaluated by the above method.

Example 2

A laminated film was obtained in the same manner as in Example 1 except that 97% by mass of commercially available block polypropylene (J640F, manufactured by Hyosung) having an MFR of 8.5 g/10 minutes (measured at 230° C. and 21.17 N), and 3% by mass of ultra-high molecular weight polyethylene particles ("MIPELON" (registered trademark), manufactured by Mitsui Chemicals, Inc.), average particle size: 10 μm) were added as compositions constituting a substrate.

Example 3

A laminated film was obtained in the same manner as in Example 1 except that 95% by mass of SEBS ("TUFTEC" (registered trademark) S1606, manufactured by Asahi Kasei Corporation, MFR: 4 g/10 minutes (measured at 230° C., 21.17 N), hardness: 67), and 5% by mass of commercially available acrylic beads (MX-300, manufactured by Soken Chemical & Engineering Co., Ltd., average particle size: 3 μm) was used as compositions constituting a resin layer A.

Example 4

A laminated film was obtained in the same manner as in Example 1 except that 100% by mass of commercially available block polypropylene (BC4FC, manufactured by Nippon Polypropylene Co., Ltd.) having an MFR of 8.5 g/10 minutes (measured at 230° C. and 21.17 N) was used as a composition constituting a substrate.

Comparative Example 1

A laminated film was obtained in the same manner as in Example 1 except that 100% by mass of commercially available isotactic polypropylene ("NOBLEN" (registered trademark) FLX80E4) manufactured by Sumitomo Chemical Co., Ltd. having an MFR of 8 g/10 minutes (measured at 230° C. and 21.17 N) was used for a substrate.

Comparative Example 2

A laminated film was obtained in the same manner as in Example 1 except that 80% by mass of SIBS ("SIBSTAR" (registered trademark) 062M, manufactured by Kaneka, MFR: 20 g/10 minutes (measured at 230° C., 21.17N), hardness; 20), and 20% by mass of a tackifier ("ARKON" (registered trademark) P100, manufactured by Arakawa Chemical Industries, Ltd.) were used as compositions constituting a resin layer A, and the thickness of the resin layer A was set to 2 μm.

Comparative Example 3

A constituent resin of each layer was prepared as follows.

Substrate: 100% by mass of commercially available block polypropylene (J640F, manufactured by Hyosung) having an MFR of 8.5 g/10 minutes (measured at 230° C. and 21.17 N) was used.

Resin layer A: 100% by mass of SEBS ("TUFTEC" (registered trademark) S1606, manufactured by Asahi Kasei Corporation, MFR: 4 g/10 minutes (measured at 230° C., 21.17 N), hardness: 67) was used.

Next, the constituent resin of each layer was charged into each extruder of a T-die composite film forming machine having two extruders, and the discharge amount of each extruder was adjusted so that the thickness of the substrate was set to 35 μm and the thickness of the resin layer A was set to 3 μm. These were laminated in this order. The laminated product was extruded from a composite T-die at an extrusion temperature of 200° C., cast on a roll having a surface temperature controlled at 40° C. and molded into a film. The molded product was wound to obtain a laminated film. In the laminated film obtained by the above method, the resin layer A and the substrate were in intimate contact with each other after winding, which caused difficult unwinding.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Substrate | Resin | | J640F | J640F | J640F | BC4FC | FLX80E4 | J640F | J640F |
| | Particles | | — | "MIPELON" | — | — | — | — | — |
| | Thickness (μm) | | 30 | 30 | 30 | 30 | 30 | 30 | 35 |
| Resin layer A | Resin | | S1606 | S1606 | S1606 | S1606 | S1606 | 062M, P100 | S1606 |
| | Particles | | — | — | MX-300 | — | — | — | — |
| | Thickness (μm) | | 3.0 | 3.0 | 3.0 | 3.0 | 3.0 | 2.0 | 3.0 |
| | Ra(a) (μm) | | 0.3 | 0.4 | 0.3 | 0.5 | 0.05 | 0.1 | 0.1 |
| | Rz(a) (μm) | | 1.7 | 3.3 | 3.7 | 3.8 | 0.5 | 2.1 | — |
| | G' (MPa) | | 1.5 | 1.5 | 1.7 | 1.5 | 1.5 | 0.2 | 1.5 |
| Resin layer B | Resin | | J640F | J640F | J640F | J640F | J640F | J640F | — |
| | Lubricant | | "EXFOLA" | "EXFOLA" | "EXFOLA" | "EXFOLA" | "EXFOLA" | "EXFOLA" | — |
| | Thickness (μm) | | 5.0 | 5.0 | 5.0 | 5.0 | 5.0 | 5.0 | — |
| | Rz(r) (μm) | | 4.3 | 4.3 | 4.3 | 4.3 | 4.3 | 4.3 | — |
| Evaluation results | Adhesive force (gf/25 mm) | Adherend A Rz (m): 3.0 μm | 6.9 | 8.0 | 5.7 | 4.5 | 9.0 | 11.5 | — |
| | | Adherend B Rz (m): 3.5 μm | 2.7 | 4.3 | 3.0 | 2.0 | 2.4 | 3.5 | — |
| | Adhesive force ratio (Adherend A/adherend B) | Numerical value | 2.6 | 1.9 | 1.9 | 2.3 | 3.8 | 3.3 | — |
| | | Determination | Good | Very good | Very good | Good | Poor | Poor | — |
| | Haze (%) | | 19 | 28 | 45 | 50 | 26 | 20 | — |

In Examples 1 to 3 satisfying our requirements, all the laminated films had a good affixing property to any adherend from the results of the adhesive force ratio. Meanwhile, in Comparative Examples 1 to 3, a difference in adhesive force to the adherend was large.

INDUSTRIAL APPLICABILITY

Our laminated films exhibit a certain adhesive force to various adherends having different irregularity shapes, whereby the laminated films can be preferably used as the surface protective film application of products having various surface shapes and made of various materials such as synthetic resin, metal and glass.

The invention claimed is:

1. A laminated film comprising a resin layer A on one surface of a substrate and a resin layer B on another surface,
wherein the resin layer A contains a styrene-based elastomer and has 1) a ten-point average surface roughness $Rz(a)$ of 1.5 μm or more and 5.0 μm or less, 2) a storage elastic modulus G' at 25° C. and 1 Hz of $3.0 \times 10^5$ Pa or more, and 3) a thickness t of $t \leq Rz(a)$.

2. The laminated film according to claim 1, having a haze value of 40% or less.

3. The laminated film according to claim 1, wherein the resin layer B has a ten-point average surface roughness $Rz(r)$ of 3.5 μm or more.

4. The laminated film according to claim 3, wherein $Rz(a) \leq Rz(r)$.

5. The laminated film according to claim 1, wherein, when a ten-point average surface roughness of a matte surface of a prism sheet as an adherend is taken as $Rz(m)$, the laminated film is affixed to the adherend satisfying $Rz(m) \leq Rz(a)$.

6. The laminated film according to claim 1, wherein the substrate contains particles.

7. The laminated film according to claim 1, wherein the resin layer A has an arithmetic average roughness $SRa(a)$ of 0.2 μm or more and less than 1 μm.

8. The laminated film according to claim 1, wherein the styrene-based elastomer of the resin layer A has a hardness of 50 or more.

* * * * *